F. M. LA BOITEAUX.
Improvement in Apparatus for Transmitting Motion.
No. 132,671. Patented Oct. 29, 1872.
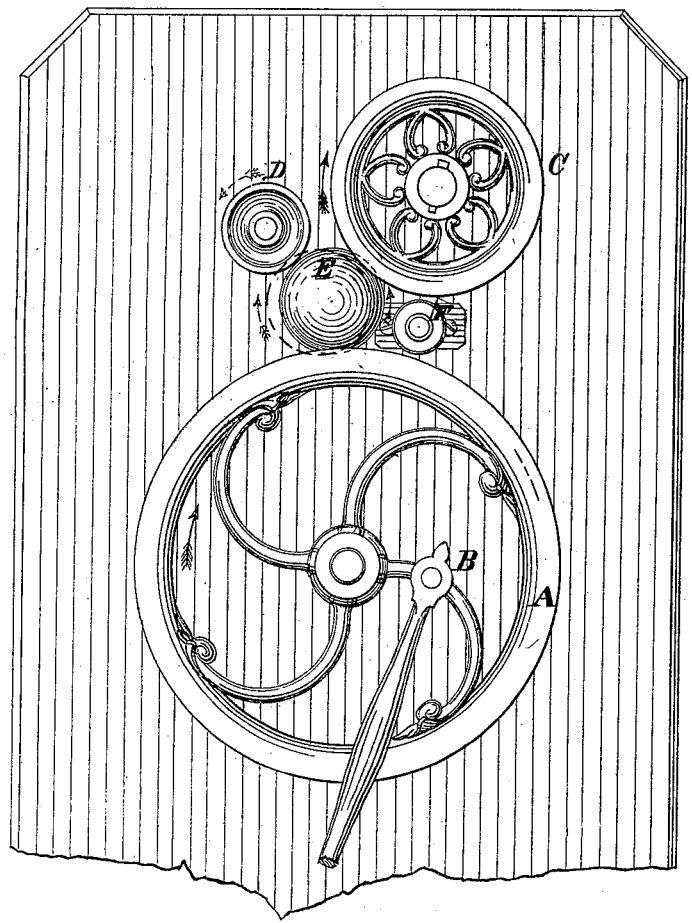
Attest.
August Fisler
A. von Kannel
Inventor.
Frank M. La Boiteaux
by
T. Van Kannel & Co.
attys

UNITED STATES PATENT OFFICE.

FRANK M. LA BOITEAUX, OF CINCINNATI, OHIO.

IMPROVEMENT IN APPARATUS FOR TRANSMITTING MOTION.

Specification forming part of Letters Patent No. 132,671, dated October 29, 1872.

*To all whom it may concern:*

Be it known that I, FRANK M. LA BOITEAUX, of Cincinnati, county of Hamilton and State of Ohio, have invented a new and Improved Mechanical Movement; and I do hereby declare that the following is a full, clear, and exact description of the same, reference being had to the annexed drawing making a part of this specification.

The nature of my invention relates to a mechanical movement having for its object the transmission of power from one wheel to a second wheel, and on reversing the first it will give motion to a third wheel, leaving the second at rest, and so on alternately. It consists substantially in the mounting of a driving-pulley either vertically or horizontally, as the nature of the case may dictate, and at a given distance from the driver, mounting a driven pulley on the same plane of motion. A ball or pulley intervenes between the two pulleys mentioned so as to touch both their peripheries. Another driven pulley is mounted at another point, so that on reversing the motion of the driver the ball is taken from the first and brought in contact with the second driven pulley.

In construction my invention is as follows: A is the driving-pulley receiving motion from the crank and pitman B. The first driven pulley C is mounted on a suitable shaft or pin; and D is a second driven pulley, the nearest part of its periphery placed at such a point in a line concentric with the driver so that the intervening ball E may come in contact with either B or C, according to the motions imparted to the driver A.

It will be observed that no particular proportion is necessarily maintained between the three pulleys mentioned. In order that a limit may be set to the distance the ball E is drawn between the driver A and driven pulleys B and C, the adjustable friction-roller F is placed as seen in the drawing for that purpose.

I do not confine myself to any particular material in the construction of the ball E. Such material is preferable which may have the greatest traction with the least amount of wear. A solid metallic ball covered with rubber or leather may be suggested as working advantageously. In the drawing I have represented all the pulleys with grooved peripheries, but pulleys with flat faces may be equally well used, in which case the transmitting pulley E is to be mounted in a swinging arm or rack to keep it in position.

From the foregoing the operation of my invention becomes obvious. The driving-wheel A receiving its motion from a treadle or otherwise in the direction indicated by the arrows, transmits it to the ball E and through the ball to the driven pulley C, the motions of each of the pulleys and the ball E being represented by the arrows marked on them respectively. On reversing the motion of the driver A the motion transmitted to the ball causes it to come in contact with the second driven pulley D, as shown by the dotted lines at $x$, whence it receives a motion reverse from that of C and leaves the latter at rest. The reverse direction of motion given to the driver and the resultant motions of ball E and pulley D is indicated by dotted arrows. The pulley A is placed at a distance from pulleys C and D in proportion to the size of the ball E to give the former the necessary gripe over the latter.

Having thus described my invention, what I claim as new, and desire to secure by Letters Patent, is—

1. The combination of the driving-pulley A, driven pulleys C or D, alternately, and a loose transmitter, E, for the purpose of transmitting motion when the driver is revolved in either direction.

2. In combination with a driving-pulley, A, and a driven pulley, C, an elastic spherical transmitter, E, held in position by suitable means, as set forth.

FRANK M. LA BOITEAUX.

Witnesses:
   T. VAN KANNEL,
   JAMES J. GORMAN.